United States Patent
Ullah et al.

(10) Patent No.: US 9,359,912 B2
(45) Date of Patent: Jun. 7, 2016

(54) RUNNER FOR CIRCUMFERENTIAL SEALS

(75) Inventors: M. Rifat Ullah, South Windsor, CT (US); Jonathan Logan Miller, East Hampton, CT (US); Leslie Charles Kurz, Hebron, CT (US)

(73) Assignee: United Technologies Corporation, Hartford, CT (US)

( * ) Notice: Subject to any disclaimer, the term of this patent is extended or adjusted under 35 U.S.C. 154(b) by 860 days.

(21) Appl. No.: 12/987,984

(22) Filed: Jan. 10, 2011

(65) Prior Publication Data

US 2012/0177486 A1 Jul. 12, 2012

(51) Int. Cl.
*F01D 5/20* (2006.01)
*F01D 25/18* (2006.01)
*F01D 11/00* (2006.01)
*F02C 7/28* (2006.01)
*F16J 15/32* (2016.01)

(52) U.S. Cl.
CPC ............ *F01D 25/183* (2013.01); *F01D 11/003* (2013.01); *F02C 7/28* (2013.01); *F16J 15/3264* (2013.01); *F05D 2260/38* (2013.01); *F05D 2300/21* (2013.01); *F05D 2300/224* (2013.01)

(58) Field of Classification Search
USPC .......................... 277/411–412, 414–416, 421; 415/173.3, 174.2, 174.3, 230, 231
See application file for complete search history.

(56) References Cited

U.S. PATENT DOCUMENTS

| | | | |
|---|---|---|---|
| 3,402,671 A * | 9/1968 | Studebaker et al. ............ 415/24 |
| 3,704,019 A | 11/1972 | McHugh |
| 3,758,179 A | 9/1973 | Smith |
| 5,183,830 A | 2/1993 | Mohring et al. |
| 5,217,232 A * | 6/1993 | Makhobey ..................... 277/411 |
| 5,284,347 A * | 2/1994 | Pope ............................. 277/305 |
| 5,813,830 A * | 9/1998 | Smith et al. ................ 415/170.1 |
| 5,947,479 A | 9/1999 | Ostrowski |
| 6,322,081 B1 * | 11/2001 | Ullah et al. .................... 277/504 |
| 6,789,803 B2 | 9/2004 | Radosav |
| 7,410,341 B2 | 8/2008 | Gockel et al. |
| 7,611,151 B2 | 11/2009 | Casucci et al. |
| 7,780,399 B1 | 8/2010 | Garrison |
| 2004/0007823 A1 | 1/2004 | Brauer et al. |
| 2009/0142180 A1 | 6/2009 | Munson |

OTHER PUBLICATIONS

European Search Report for Application No. 12150316.3, mailed Sep. 16, 2014.

* cited by examiner

*Primary Examiner* — Gilbert Lee
*Assistant Examiner* — Thomas Neubauer
(74) *Attorney, Agent, or Firm* — Carlson, Gaskey & Olds, P.C.

(57) ABSTRACT

A runner assembly for a circumferential seal assembly includes a runner defined about an axis. The runner has an inwardly extending runner mounting flange. A radially flexible clamp is engaged with the inwardly extending mounting flange. An axial spring is trapped between an axial retainer and the runner. The runner, the radially flexible clamp, the axial spring, and the axial retainer are co-rotatable about the axis. The axial retainer is radially inline with the runner and spaced from a radially inner surface of the runner such that there is a radial gap between the axial retainer and the radially inner surface of the runner permitting radial movement of the runner.

16 Claims, 4 Drawing Sheets

US 9,359,912 B2

RUNNER FOR CIRCUMFERENTIAL SEALS

BACKGROUND

The present disclosure relates to circumferential seals, and in particular, to a circumferential seal having a ceramic runner for gas turbine engines.

Seal systems with ceramic circumferential runners are often used in the high temperature environment of gas turbine engines where rotational structure extends through stationary structures, for example, to seal mainshaft bearing compartments. The runner is mounted to the rotational structure such as the engine shaft through a flexible mount structure and ride upon a rotationally stationary carbon seal.

A primary challenge to utilization of ceramic runners within a circumferential seal is the flexible mount structure.

SUMMARY

A runner assembly for a circumferential seal assembly according to an exemplary aspect of the present disclosure includes a runner defined about an axis of rotation, the runner having an inwardly extending runner mounting flange adjacent to a distal end of the runner. A radially flexible clamp is engaged with the inwardly extending mounting flange. An axial retainer which traps an axial spring between the axial retainer and the runner.

A runner assembly for a circumferential seal assembly according to an exemplary aspect of the present disclosure includes a runner defined about an axis of rotation, the runner having an inwardly extending runner mounting flange adjacent to a distal end of the runner. An axially flexible clamp engaged with the distal end of the runner and a radially flexible clamp engaged with the inwardly extending mounting flange.

A runner assembly for a circumferential seal assembly according to an exemplary aspect of the present disclosure includes a runner defined about an axis of rotation, the runner having an inwardly extending runner mounting flange adjacent to a distal end of the runner. A radially flexible clamp includes a radially inwardly extending flange at one end section and an axially extending lip at an opposite end section connected by a radial flex arm, the axially extending lip engaged with the distal end of said runner. An axial retainer engaged with said inwardly extending runner mounting flange.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
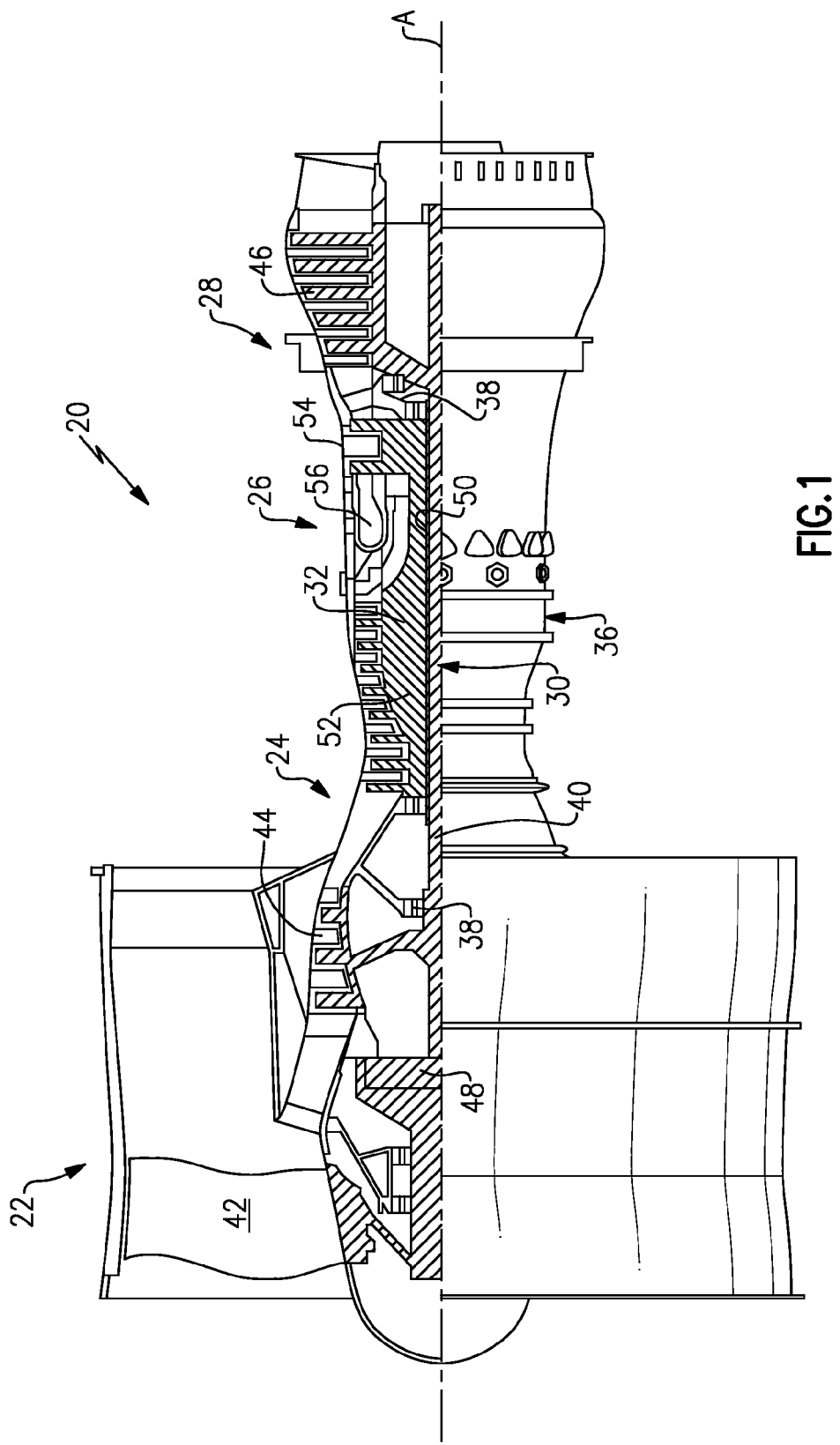
FIG. 1 is a schematic cross-section of a gas turbine engine.

FIG. 1 schematically illustrates a gas turbine engine 20. The gas turbine engine 20 is disclosed herein as two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low speed spool 30 and high speed spool 32 mounted for rotation about an engine central longitudinal axis A relative to an engine static structure 36 via several bearing systems 38. The low speed spool 30 generally includes an inner shaft 40 that interconnects a fan 42, a low pressure compressor 44 and a low pressure turbine 46. The inner shaft 40 may drive the fan 42 either directly or through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the low pressure compressor 44 then the high pressure compressor 52, mixed with the fuel in the combustor 56, then expanded over the high pressure turbine 54 and low pressure turbine 46. The turbines 54, 46 rotationally drive the respective low speed spool 30 and high speed spool 32 in response to the expansion.

Figure 2:
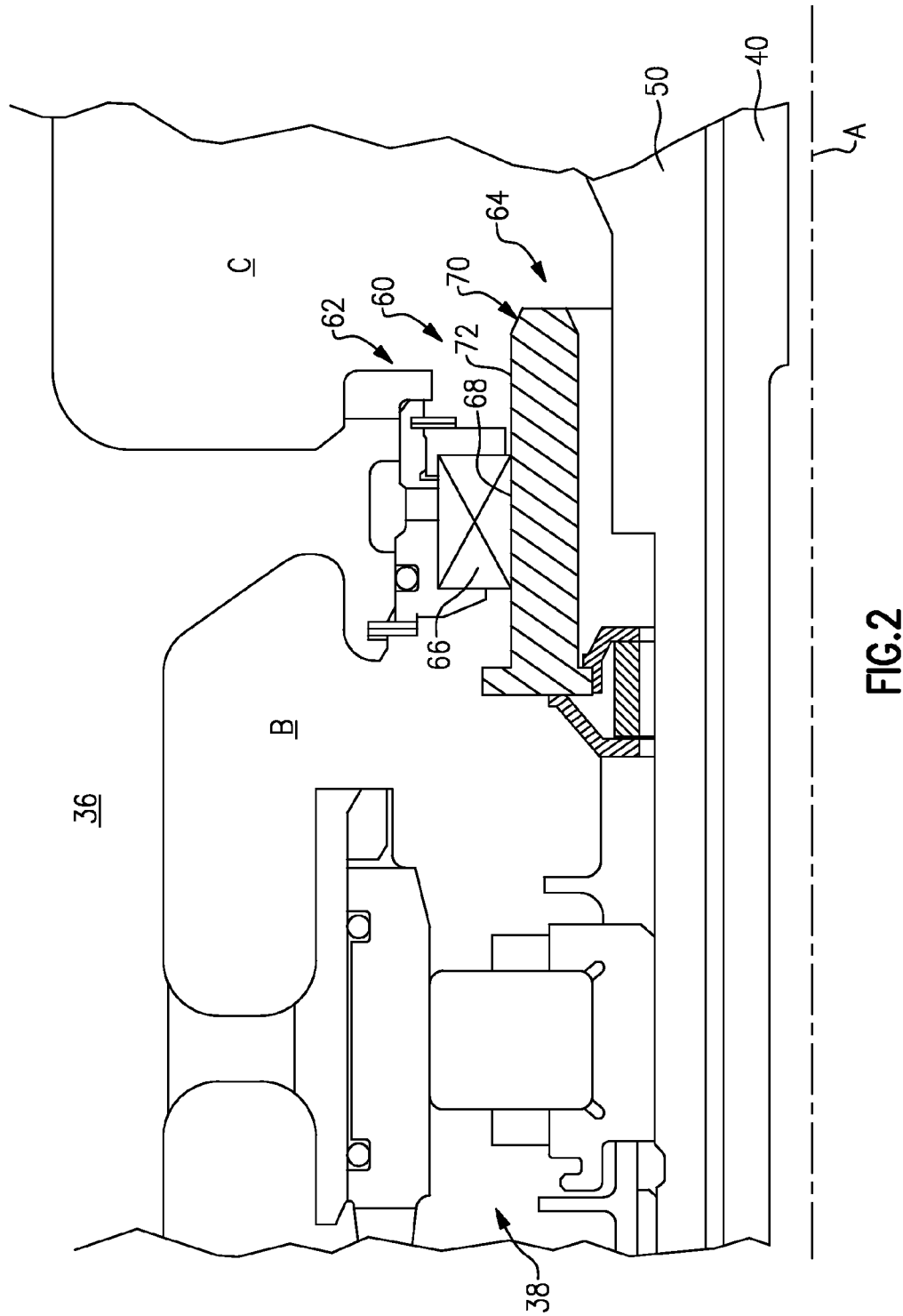
FIG. 2 is an enlarged sectional view of a section of the gas turbine engine which illustrates a circumferential seal assembly.

With reference to FIG. 2, the main engine shafts 40, 50 extend through several engine compartments B, C and are supported at a plurality of points by the bearing system 38 and the static structure 36. Various types of bearing systems 38 are known for such a purpose.

A circumferential seal assembly 60 ensures that the shafts 40, 50 are sealed at several points to prevent unwanted fluid leakage between, for example, engine compartments B, C. Circumferential seals are widely used in gas turbine engines for sealing of mainshaft bearing compartments where, for example, bearing lubrication oil in the bearing compartment must be separated from cooling compartments. The category of circumferential seals includes, but not limited to, mechanical sealing technologies commonly referred to as segmented circumferential contacting seals, archbound circumferential seals, and controlled-gap seals.

The circumferential seal assembly 60 generally includes a stator seal assembly 62 mounted to the static structure 36 and a runner assembly 64 mounted to a rotating component such as the main engine shafts 40, 50. This disclosure is directed to the runner assembly 64 such that the stator seal assembly 62 is not within the scope of the disclosure and may be of various forms.

The stator seal assembly 62 typically supports a carbon sealing ring 66. The carbon sealing ring 66 has a radially inwardly facing curved surface 68 upon which a runner 70 of the runner assembly 64 runs. The runner 70 defines a radially outward facing curved sealing surface 72 which engages the radially inwardly facing curved surface 68 to control fluid leakage therebetween.

Figure 3:
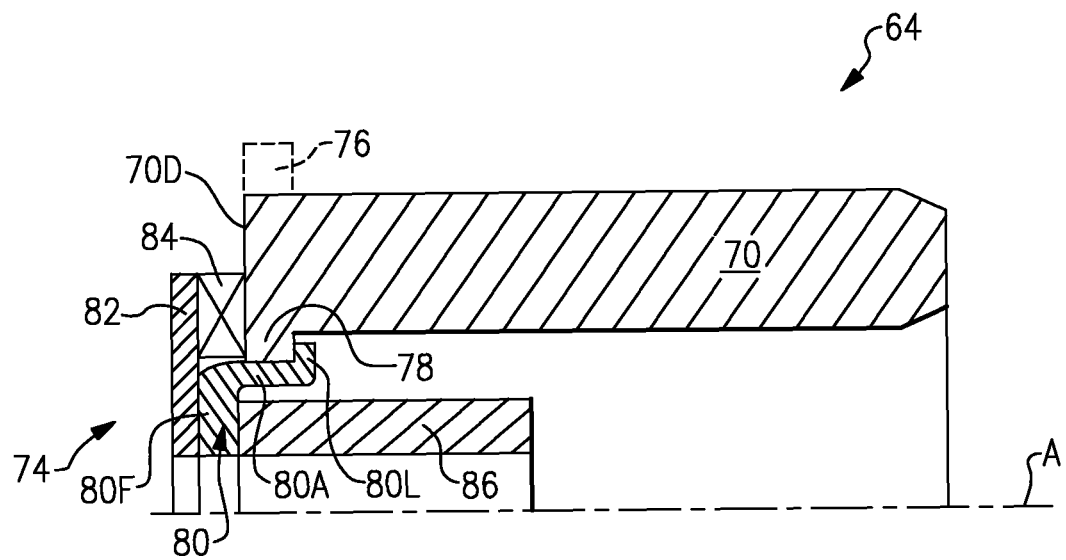
FIG. 3 is an enlarged sectional view of a circumferential seal assembly according to one non-limiting embodiment of the present disclosure.

With reference to FIG. 3, the runner 70 is supported upon a retainer assembly 74. The runner 70 is manufactured of a structural ceramic material while the retainer assembly 74 may be manufactured of metallic material such as a steel alloy. The thermal growth of the ceramic material is low due to its low coefficient of thermal expansion. The mechanical radial growth due to centrifugal forces is also low due to the high stiffness-to-weight ratio of the ceramic material. Thus, the runner 70 closely tracks the carbon sealing ring 66 to provide a more constant gap therebetween throughout the entire operating envelope of the engine 20. The retainer assembly 74 provides a relatively simple and cost effective resilient mount for the ceramic runner 70.

At one axial end section, the runner 70 may include an optional radially outward extending flange 76 which operates as an oil slinger. At this same axial end section, the runner 70 has a radially inwardly extending mounting flange 78 adapted to receive a clamping load.

In one non-limiting embodiment, the retainer assembly 74 generally includes a radially flexible clamp 80, an axial retainer 82 and an axial spring 84 which provides the clamping load. In this non-limiting embodiment, the radially inwardly extending mounting flange 78 is located at a distal end 70D of the runner 70.

The radially flexible clamp 80 includes a cylindrical portion 80A having a radially inwardly extending flange 80F at one end section, and a radially outwardly extending lip 80L at an opposite end section. The length and thickness of the cylindrical portion 80A may be selected to impart a desired radial flexibility to the radially flexible clamp 80. That is, the cylindrical portion 80A operates as a cantilevered beam rigidly fixed at the flange 80F by, for example, a spacer 86 or other axial stop, which interfaces with other structures (not shown).

The axial retainer 82 traps the axial spring 84 between the axial retainer 82 and the distal end 70D of the runner 70. The axial spring 84 may be an annular member, such as a wave spring, a belville washer, or other element that imparts an axial bias to the runner 70 such that axial loads thereon are absorbed with minimal impact loads to the runner 70. That is, the axial retainer 82 traps the axial spring 84 to accommodate axial movement and provide a clamping load while the axial retainer 82 is essentially a stop to retain the axial spring 84.

Figure 4:
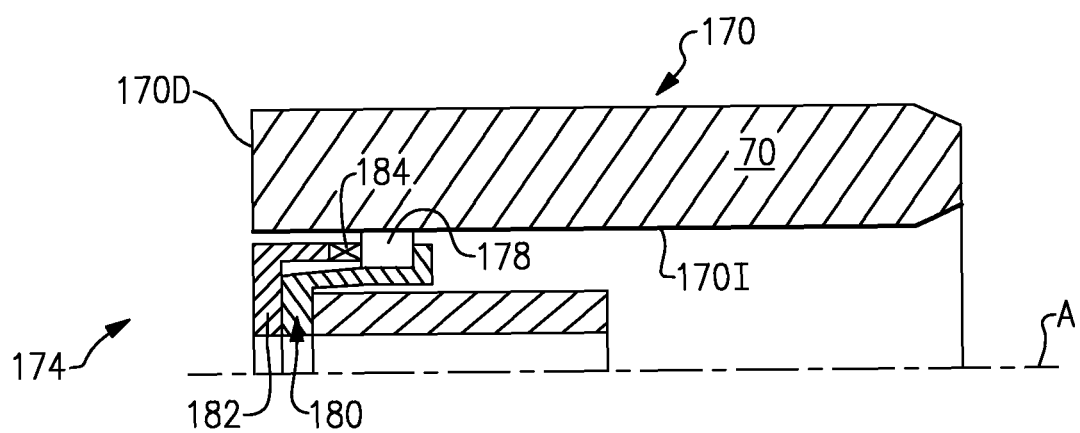
FIG. 4 is an enlarged sectional view of a circumferential seal assembly according to another non-limiting embodiment of the present disclosure.

With reference to FIG. 4, another non-limiting embodiment of a retainer assembly 174 generally includes a radially flexible clamp 180, an axial retainer 182 and an axial spring 184 which provides the clamping load to the inwardly extending mounting flange 178. In this non-limiting embodiment, the radially inwardly extending mounting flange 178 is located axially inboard of a distal end 170D of the runner 170.

The axial retainer 182 is offset from a radially inwardly facing curved surface 170I of the runner 170 by a radial gap to permit an envelope for radial movement of the runner 170 through the radially flexible clamp 180. The location of the radially inwardly extending mounting flange 178 facilitates an axial displacement of the retainer assembly 174 inboard of the distal end 170D to reduce axial packaging space.

Figure 5:
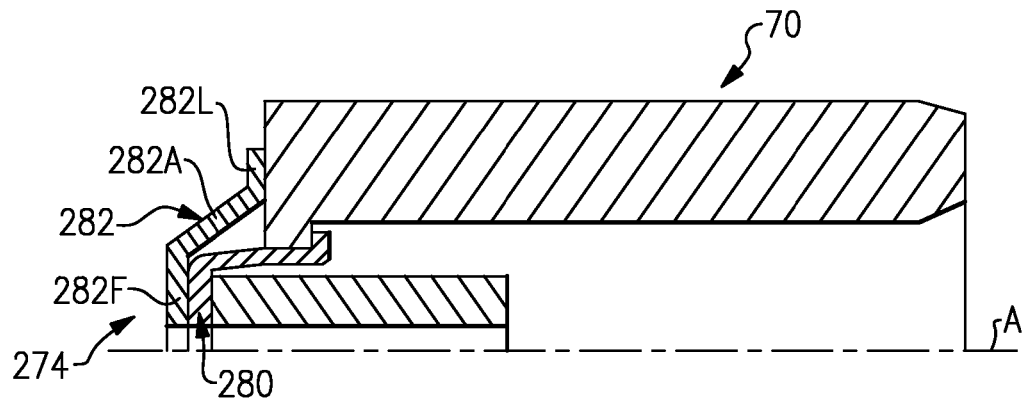
FIG. 5 is an enlarged sectional view of a circumferential seal assembly according to another non-limiting embodiment of the present disclosure.

With reference to FIG. 5, another non-limiting embodiment of a retainer assembly 274 generally includes a radially flexible clamp 280, and an axially flexible clamp 282 which provides the clamping load to the runner 70.

The radially flexible clamp 280 is generally similar to that described in the FIG. 4 embodiment, while the axially flexible clamp 282 integrates the axial spring function therein. The axially flexible clamp 282 includes a conical cylindrical portion 282A having a radially inwardly extending flange 282F at one end section, and a radially outwardly extending lip 282L at the opposite end section. The cone angle, wall thickness, and length of the conical cylindrical portion 282A may be selected to impart a desired axial force to the runner 70.

Figure 6:
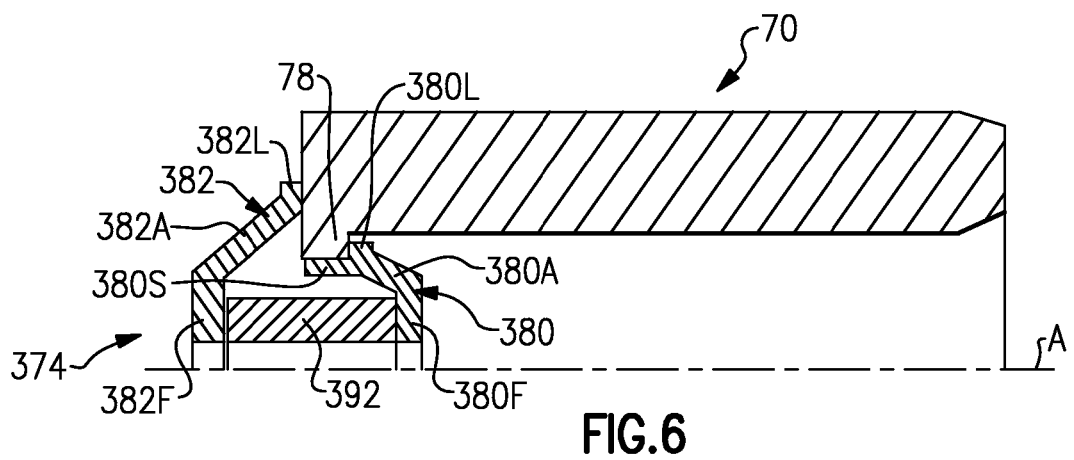
FIG. 6 is an enlarged sectional view of a circumferential seal assembly according to another non-limiting embodiment of the present disclosure.

With reference to FIG. 6, another non-limiting embodiment of a retainer assembly 374 generally includes a radially flexible clamp 380, and an axially flexible clamp 382 which provides a clamping load on runner 70.

The axially flexible clamp 382 is generally similar to that described in the FIG. 5 embodiment. The radially flexible clamp 380 is in an opposed position relative to the spacer 392. The radially flexible clamp 380 is on one side of the spacer 392 while the axially flexible clamp 382 is on the other side to trap the spacer 392 therebetween.

The radially flexible clamp 380 includes a conical cylindrical portion 380A having a radially inwardly extending flange 380F at one end section, and a radially outwardly extending lip 380L at the opposite end section. An axially extending shelf 380S extends toward the axially flexible clamp 382 to support the inwardly extending mounting flange 78 and provide a cantilevered beam to radially support the runner 70. The cone angle, length, and thickness of the conical cylindrical portion 380A may be selected to impart radial flexibility while the radially outwardly extending lip 380L operates as stop to react the force applied by the axially flexible clamp 382.

The axially flexible clamp 382 includes a conical cylindrical portion 382A having a radially inwardly extending flange 382F at one end section, and a radially outwardly extending lip 382L at the opposite end section. The cone angle and the wall thickness of the conical cylindrical portion 382A may be selected to impart a desired axial force to the runner 70.

Figure 7:
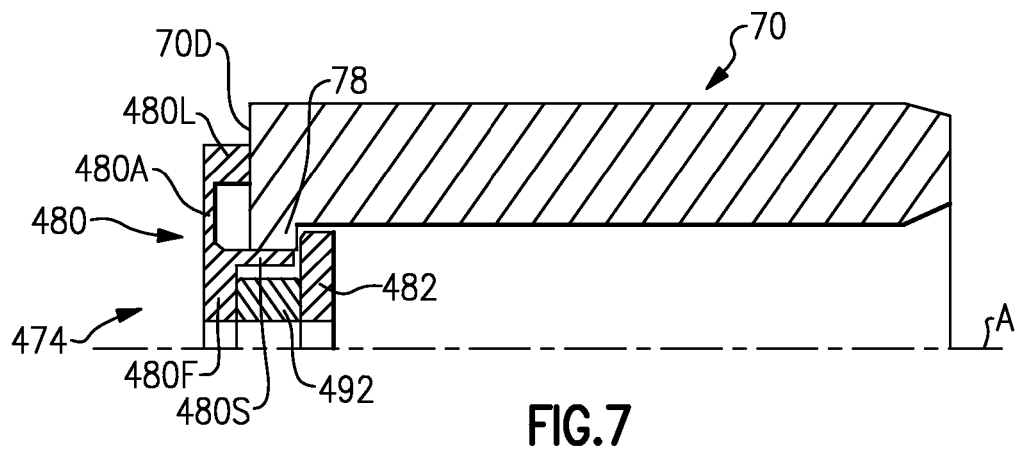
FIG. 7 is an enlarged sectional view of a circumferential seal assembly according to another non-limiting embodiment of the present disclosure.

With reference to FIG. 7, another non-limiting embodiment of a retainer assembly 474 generally includes a flexible clamp 480 and an axial retainer 482. The flexible clamp 480 and the axial retainer 482 are in an opposed position relative to a spacer 492 generally similar to that describe above in the FIG. 6 embodiment.

The axial retainer 482 in one non-limiting embodiment is a cylindrical ring which axially supports the runner 70 through interaction with the inwardly extending mounting flange 78. That is, the axial retainer 482 operates as a stop.

The flexible clamp 480 includes a radially inwardly extending flange 480F at one end section and an axially extending lip 480L at the opposite end section connected by a radial flex arm 480A. That is, the radially inwardly extending flange 480F and the flex arm 480A essentially define a cylindrical plate with a relatively thicker inner diameter which defines the radially inwardly extending flange 480F and a relatively thinner outer diameter which defines the flex arm 480A. The length, thickness and cone angle of the flex arm 480A may be selected to impart the desired axial flexibility and operates as an integral axial spring through the axially extending lip 480L which abuts a distal end 70D of the runner 70.

An axially extending shelf 480S axially extends toward the axial retainer 482 to support the inwardly extending mounting flange 78 and operates as a cantilevered beam to radially support the runner 70. The axially extending shelf 480S may extend from the interface between the radially inwardly extending flange 480F and the flex arm 480A generally parallel to the axially extending lip 480L. The length and thickness of the axially extending shelf 480S may be selected to impart the desired radial flexibility.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A runner assembly for a circumferential seal assembly comprising:
   a runner defined about an axis, said runner having an inwardly extending runner mounting flange;
   a radially flexible clamp engaged with said inwardly extending mounting flange;
   an axial spring; and
   an axial retainer which traps said axial spring between said axial retainer and said runner, said runner, said radially flexible clamp, said axial spring, and said axial retainer being co-rotatable about said axis, wherein said axial retainer is radially inline with said runner and spaced from a radially inner surface of said runner such that there is a radial gap between said axial retainer and said radially inner surface of said runner permitting radial movement of said runner.

2. The runner assembly as recited in claim 1, wherein said runner is manufactured of a ceramic material.

3. The runner assembly as recited in claim 1, wherein said inwardly extending runner mounting flange extends to said distal end of said runner.

4. The runner assembly as recited in claim 1, wherein said radially flexible clamp includes a cylindrical portion having a radially inwardly extending flange at one end section, and a radially outwardly extending lip at an opposite end section.

5. The runner assembly as recited in claim 1, wherein said axial spring is a belville washer or wave spring.

6. The runner assembly as recited in claim 1, wherein a radially inwardly extending flange of said radially flexible clamp is adjacent to a radially inwardly extending flange of said axially flexible clamp.

7. A runner assembly for a circumferential seal assembly comprising:
   a runner defined about an axis, said runner having opposed axial ends and an inwardly extending runner mounting flange spaced between said opposed axial ends;
   an axially flexible clamp engaged with said inwardly extending mounting flange; and
   a radially flexible clamp engaged with said inwardly extending mounting flange, said runner, said axially flexible clamp, and said radially flexible clamp being co-rotatable about said axis, wherein said axially flexible clamp is radially inline with said runner and spaced from a radially inner surface of said runner such that there is a radial gap between said axially flexible clamp and said radially inner surface of said runner permitting radial movement of said runner.

8. The runner assembly as recited in claim 7, wherein said runner is manufactured of a ceramic material.

9. The runner assembly as recited in claim 7, wherein a radially inwardly extending flange of said radially flexible clamp is adjacent to a radially inwardly extending flange of said axially flexible clamp.

10. The runner assembly as recited in claim 7, wherein said radially flexible clamp includes a cylindrical portion having a radially inwardly extending flange at one end section, and a radially outwardly extending lip at an opposite end section.

11. A runner assembly for a circumferential seal assembly comprising:
    a runner defined about an axis, said runner having an inwardly extending runner mounting flange;
    a radially flexible clamp includes a radially inwardly extending flange at one end section and an axially extending lip at an opposite end section connected by a radial flex arm, said axially extending lip engaged with said distal end of said runner; and
    an axial retainer engaged with said inwardly extending runner mounting flange, said runner, said radially flexible clamp, and said axial retainer being co-rotatable about said axis, wherein said axial retainer is radially inline with said runner and is spaced from a radially inner surface of said runner such that there is a radial gap between said axial retainer and said radially inner surface of said runner permitting radial movement of said runner.

12. The runner assembly as recited in claim 11, wherein said runner is manufactured of a ceramic material.

13. The runner assembly as recited in claim 1, wherein said inwardly extending runner mounting flange is adjacent to a distal end of said runner.

14. The runner assembly as recited in claim 1, wherein said inwardly extending runner mounting flange is axially displaced from an axial end of said runner.

15. The runner assembly as recited in claim 1, wherein said axial spring abuts said inwardly extending runner mounting flange.

16. The runner assembly as recited in claim 15, wherein said axial retainer abuts said axial spring.

* * * * *